US008980530B2

(12) United States Patent
Mochizuki et al.

(10) Patent No.: US 8,980,530 B2
(45) Date of Patent: *Mar. 17, 2015

(54) OPTICAL INFORMATION RECORDING MEDIUM AND METHOD FOR RECORDING INFORMATION IN OPTICAL INFORMATION RECORDING MEDIUM

(71) Applicant: FUJIFILM Corporation, Minato-ku, Tokyo (JP)

(72) Inventors: Hidehiro Mochizuki, Odawara (JP); Toshio Sasaki, Odawara (JP); Masaharu Akiba, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/040,252

(22) Filed: Sep. 27, 2013

(65) Prior Publication Data

US 2014/0029403 A1 Jan. 30, 2014

Related U.S. Application Data

(63) Continuation of application No. PCT/JP2011/072394, filed on Sep. 29, 2011.

(30) Foreign Application Priority Data

Mar. 28, 2011 (JP) .................................. 2011-070029

(51) Int. Cl.
G11B 7/24 (2013.01)
G11B 7/246 (2013.01)
(Continued)

(52) U.S. Cl.
CPC ................ *G11B 7/246* (2013.01); *G11B 7/245* (2013.01); *G11B 7/00452* (2013.01); *G11B 7/24038* (2013.01); *G11B 2007/00457* (2013.01)

USPC ..................... 430/270.15; 428/64.8; 369/284; 369/286

(58) Field of Classification Search
None
See application file for complete search history.

(56) References Cited

U.S. PATENT DOCUMENTS 4,288,861 A * 9/1981 Swainson et al. ............. 365/127
5,627,817 A * 5/1997 Rosen et al. .................. 369/100

(Continued)

FOREIGN PATENT DOCUMENTS

JP 2000-132865 A 5/2000
JP 2001184720 A 7/2001

(Continued)

OTHER PUBLICATIONS

Makarov et al. "Resonance enhancement of two-photon absorption of phthalocyanines for 3D optical storage in the presence of hot-band absorption", Proc. SPIE vol. 6470 pp. 64700R- to 64700R-12 (2007).*

(Continued)

*Primary Examiner* — Martin Angebranndt
(74) *Attorney, Agent, or Firm* — Sughrue Mion, PLLC

(57) ABSTRACT

An optical information recording medium 10 comprises a plurality of recording layers 14, and intermediate layers 15 each provided between the recording layers 14. Each of the recording layers 14 includes polymer binder and dye dispersed in the polymer binder, and the dye is subject to multi-photon absorption of a recording beam RB having a predetermined wavelength and to linear absorption not smaller than 1.5% per recording layer at the predetermined wavelength of the recording beam. When the dye is irradiated with the recording beam and generates heat by linear absorption and multi-photon absorption of the recoding beam RB, the polymer binder undergoes a change of shape by the generated heat, whereby an interface between the recording layer 14 and the intermediate layer undergoes a change of shape to record information.

8 Claims, 10 Drawing Sheets

(51) Int. Cl.
*G11B 7/245* (2006.01)
*G11B 7/0045* (2006.01)
*G11B 7/24038* (2013.01)

(56) References Cited

U.S. PATENT DOCUMENTS

| | | | | |
|---|---|---|---|---|
| 5,669,995 | A | * | 9/1997 | Hong ........................... 369/94 |
| 5,912,257 | A | | 6/1999 | Prasad et al. |
| 6,402,037 | B1 | | 6/2002 | Prasad et al. |
| 8,116,194 | B2 | | 2/2012 | Iwamura et al. |
| 8,202,597 | B2 | * | 6/2012 | Ishida et al. ............... 428/64.1 |
| 8,449,794 | B2 | * | 5/2013 | Takahashi et al. .......... 252/582 |
| 8,477,577 | B2 | * | 7/2013 | Sasaki et al. ............. 369/47.15 |
| 8,526,291 | B2 | * | 9/2013 | Mochizuki et al. ........ 369/275.3 |
| 8,644,126 | B2 | * | 2/2014 | Kitahara ..................... 369/286 |
| 8,670,296 | B2 | * | 3/2014 | Mochizuki et al. .......... 369/284 |
| 2005/0142318 | A1 | * | 6/2005 | Nakabayashi et al. ....... 428/40.1 |
| 2009/0246443 | A1 | * | 10/2009 | Akiba et al. ................ 428/64.8 |
| 2010/0003617 | A1 | * | 1/2010 | Suzuki et al. ............ 430/270.11 |
| 2010/0035013 | A1 | | 2/2010 | Kubo et al. |
| 2010/0055448 | A1 | | 3/2010 | Tomura et al. |
| 2010/0110858 | A1 | | 5/2010 | Iwamura et al. |
| 2013/0100791 | A1 | * | 4/2013 | Mochizuki et al. ............ 369/83 |
| 2013/0121127 | A1 | * | 5/2013 | Kitahara ..................... 369/275.1 |
| 2013/0229901 | A1 | * | 9/2013 | Mochizuki et al. ............ 369/94 |
| 2014/0023816 | A1 | * | 1/2014 | Kitahara ..................... 428/64.9 |
| 2014/0078878 | A1 | * | 3/2014 | Tsuyama et al. ............. 369/116 |
| 2014/0120295 | A1 | * | 5/2014 | Mochizuki et al. .......... 428/41.8 |
| 2014/0153375 | A1 | * | 6/2014 | Henmi et al. ................ 369/100 |

FOREIGN PATENT DOCUMENTS

| | | | |
|---|---|---|---|
| JP | 2001-520637 | A | 10/2001 |
| JP | 2004-095142 | A | 3/2004 |
| JP | 2005-037658 | A | 2/2005 |
| JP | 2008087476 | A | 4/2008 |
| JP | 2008-130102 | A | 6/2008 |
| JP | 2008-233413 | * | 10/2008 |
| JP | 2009-170013 | A | 7/2009 |
| JP | 2009-221563 | A | 10/2009 |
| JP | 2010-272175 | * | 12/2010 |

OTHER PUBLICATIONS

Daniel Day, et al., "Formation of voids in a doped polymethylmethacrylate polymer", Applied Physics Letters, Apr. 1, 2002, pp. 2404-2406, vol. 80, No. 13.

Kurt F. Wissbrun, "Thermal expansion and flow model for pit formation in laser marking of polymeric film optical disks", Journal of Applied Physics, Aug. 1, 1987, pp. 1123-1124, vol. 62, No. 3.

Mansoor Sheik-Bahae, et al., "Sensitive Measurement of Optical Nonlinearities Using a Single Beam", IEEE Journal of Quantum Electronics, Apr. 1990, pp. 760-769, vol. 26, No. 4.

International Search Report in PCT/JP2011/072394 dated Jan. 10, 2012, 9 pages in Japanese and English.

Written Opinion in PCT PCT/JP2011/072394 dated Jan. 10, 2012, 3 pages.

Notification of Reasons for Refusal, dated Jan. 28, 2014, issued in corresponding JP Application No. 2011-070029, 4 pages in English and Japanese.

* cited by examiner

FIG.5
(a)
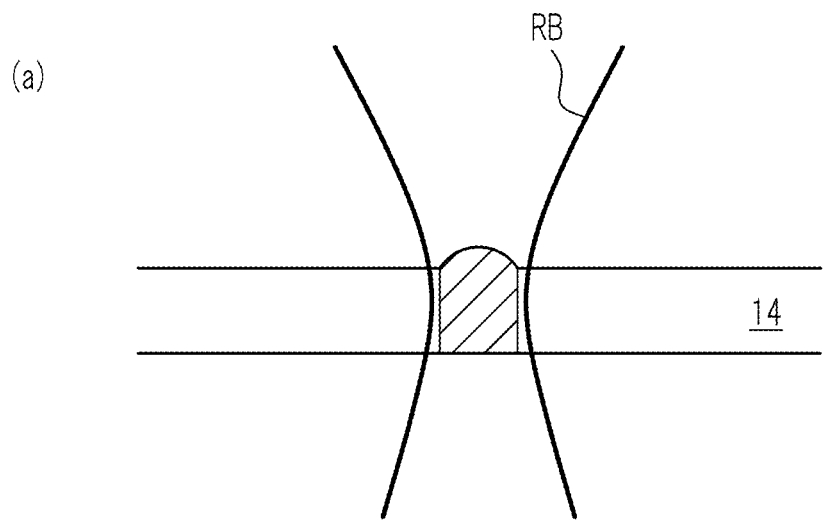
(b)
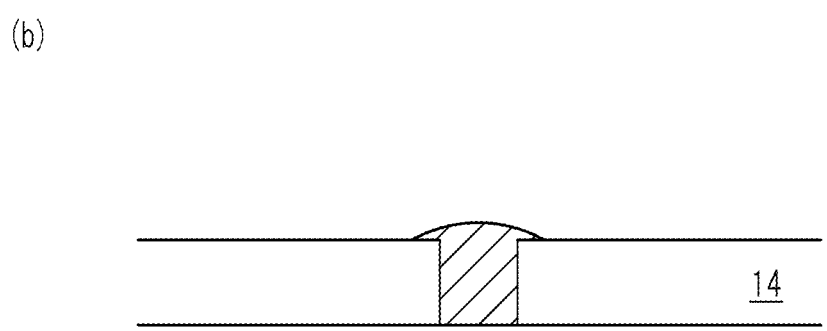
(c)
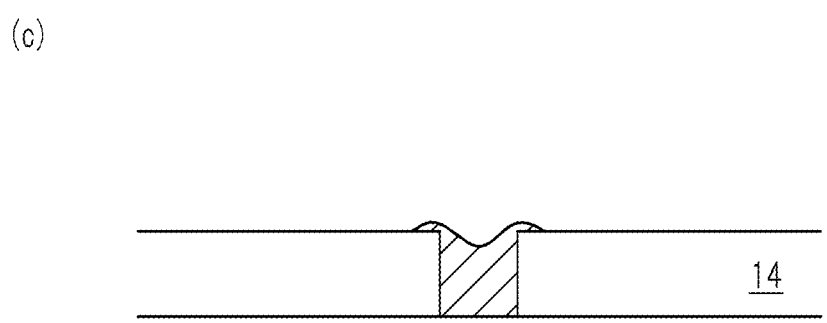

FIG. 6

| | Recording layer | | | | Wavelength of Recording beam [nm] | Linear absorption for Recording beam [%] | Two-photon absorption cross-section for Recording beam [GM] | Relative Recording Sensitivity |
|---|---|---|---|---|---|---|---|---|
| | Polymer binder | Dye | Conc. [wt%] | Molarity [mol/L] | | | | |
| Example 1 | Polyvinyl acetate | Compound A | 25.0 | 1.0 | 405 | 3.0 | 110 | 11.1 |
| Example 2 | Polyvinyl acetate | Compound A | 22.3 | 0.8 | 405 | 2.5 | 110 | 5.8 |
| Example 3 | Polyvinyl acetate | Compound A | 11.9 | 0.4 | 405 | 1.7 | 110 | 4.9 |
| Comparative Example 1 | Polyvinyl acetate | Compound A | 6.4 | 0.2 | 405 | 1.3 | 110 | 0.7 |
| Comparative Example 2 | Polyvinyl acetate | Compound B | 30.0 | 1.2 | 405 | 0.8 | 80 | 1.0 |
| Comparative Example 3 | Polyvinyl acetate | Compound B | 22.3 | 0.8 | 405 | 0.6 | 80 | 0.4 |
| Comparative Example 4 | Polyvinyl acetate | Compound B | 12.5 | 0.4 | 405 | 0.5 | 80 | 0.1 |
| Comparative Example 5 | Polyvinyl acetate | Compound C | 2.1 | - | 405 | 3.0 | 0 | 0.0 | ns
OPTICAL INFORMATION RECORDING MEDIUM AND METHOD FOR RECORDING INFORMATION IN OPTICAL INFORMATION RECORDING MEDIUM

CROSS-REFERENCE TO RELATED APPLICATION(S)

This application is a continuation application of International Application No. PCT/JP2011/072394 filed on Sep. 29, 2011, which claims priority to Japanese Patent Application No. 2011-070029 filed on Mar. 28, 2011, the disclosures of which are incorporated herein by reference in their entireties.

TECHNICAL FIELD

The present invention relates to an optical information recording medium and a method for recording information in an optical information recording medium.

BACKGROUND ART

In order to increase recording capacity of an optical information recording medium, attempts have been made on the optical information recording medium to laminate recording layers into a multi-layered structure. As optical information recording media which have been put into practical use for recording information in a plurality of recording layers, write-once digital versatile disks (DVDs) and write-once Blu-ray discs (registered trademark) are already known. However, these media use a one-photon absorption material in the recording layers, with the result that there is a low layer selectivity for causing only a particular recording layer to react upon recording and further that when a far side recording layer is recorded as viewed from a recording beam radiation side, the recording beam is absorbed by near side recording layers. This disadvantageously results in a large loss of the recording beam.

Accordingly, in recent years, attempts have been made to use a multi-photon absorption reaction for the multilayer optical recording medium, in which a reaction occurs only at a limited region in a depth direction upon irradiation with the recording beam, for the purpose of increasing the layer selectivity upon recording thereby increasing the number of recording layers (see, for example, Patent Literature 1, Patent Literature 2, and Non-patent Literature 1). Multi-photon absorption reaction is a reaction of absorbing photons which takes place when a recording layer is given a plurality of (e.g., two) photons substantially simultaneously. For example, in a two-photon absorption reaction, light is absorbed proportionally to the square of the intensity of the light, so that the reaction takes place only at and around the focal point of a beam and if a recording beam having a wavelength at which no one-photon absorption occurs therein is used, the near side recording layers transmits the recording beam without allowing one-photon absorption to occur therein. This is advantageous to increase the number of recording layers.

CITATION LIST

Patent Literature

Patent Literature 1: Japanese laid-open patent application publication No. 2005-037658
Patent Literature 2: Japanese laid-open patent application publication No. 2009-170013

Non Patent Literature

Non-patent Literature 1: Daniel Day and Min Gu, Appl. Phys. Lett. 80, 13 (2002)

SUMMARY OF THE INVENTION

Technical Problem

However, multi-photon absorption compounds are poor in the light (multi-photon) absorption efficiency and thus lower in the recording sensitivity than one-photon absorption compounds which have been widely and practically used as a recording material for the optical information recording medium. Such a lower recording sensitivity forms a bottleneck in an attempt to increase the recording speed.

To increase the recording sensitivity in an optical information recording medium utilizing a multi-photon absorption reaction (two-photon absorption reaction), the two-photon absorption cross-section which is the absorption efficiency per molecule may be increased or the number of molecules (concentration) of the multi-photon absorption dye may be increased. However, increasing the two-photon absorption cross-section is technically difficult, and it is thus difficult to greatly increase the absorption efficiency. On the other hand, increasing the concentration of the multi-photon absorption dye has limitations placed by the solubility of the dye and this may possibly cause adverse effect due to interaction with other components. Therefore, it is difficult to greatly increase the sensitivity.

In view of the above, it is an object of the present invention to improve the recording sensitivity of an optical information recording medium which utilizes a multi-photon is absorption reaction.

Solution to Problem

To solve the aforementioned problem, the present invention provides an optical information recording medium which comprises: a plurality of recording layers; and intermediate layers each provided between the recording layers, wherein each of the recording layers includes polymer binder and dye dispersed in the polymer binder, and the dye is subject to multi-photon absorption of a recording beam having a predetermined wavelength and to linear absorption not smaller than 1.5% per recording layer at the predetermined wavelength of the recording beam, and wherein when the dye is irradiated with the recording beam and generates heat by linear absorption and multi-photon absorption of the recoding beam, the polymer binder undergoes a change of shape by the generated heat, whereby an interface between the recording layer and the intermediate layer undergoes a change of shape to record information.

In this optical information recording medium, the dye contained in the recording layers is subject to multi-photon absorption and linear absorption (one-photon absorption) by irradiation with the recording beam. Accordingly, a reaction proceeds efficiently as compared to the conventional method using a dye which is subject to multi-photon absorption only by the irradiation with the recording beam. The inventors of the present invention found that if the recording layer is configured such that a dye is dispersed in a polymer binder, irradiation with the recording beam causes an interface between a recording layer and an intermediate layer to be deformed, whereby information can be recorded with high sensitivity. Therefore, according to the optical information recording medium of the present invention, the recording sensitivity of the optical information recording medium utilizing a multi-photon absorption reaction can be improved.

According to the present invention, since the one dye is subject to both the multi-photon absorption and the linear absorption, it is not necessary that a dye for multi-photon absorption and a dye for linear absorption are mixed together in the recording layer. Therefore, the number of constituent materials for the recording layer can be reduced as compared to the configuration in which the dye for multi-photon absorption and the dye for linear absorption are mixed together, and the flexibility in the choice of the recording material can be increased as an interaction between the materials does not have to be considered.

In the aforementioned optical information recording medium, it is preferable that the dye has linear absorption of the recording beam not more than 5% per recording layer. The dye having linear absorption not more than 5% per recording layer allows the recording beam to reach far deeper layers as viewed from the recording beam irradiation side. This makes it possible to increase the number of recording layers, specifically to increase a multi-layered medium containing 20 recording layers or more.

In the aforementioned optical information recording medium, a protrusion sticking out into the intermediate layer may be formed in the interface.

In the aforementioned optical information recording medium, the dye has a structure, for example, represented by the following formula:

[Chem. 1]

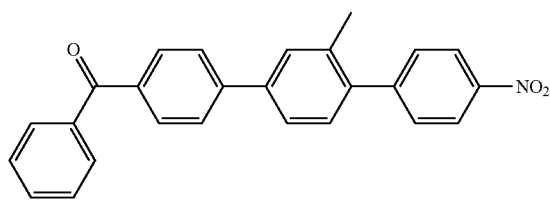

To solve the aforementioned problem, the present invention provides a method for recording information in an optical information recording medium, comprising the steps of: preparing an optical information recording medium comprising a plurality of recording layers and intermediate layers each provided between the recording layers, each recording layer including polymer binder and dye dispersed in the polymer binder; and irradiating a recording layer with a recording beam having a predetermined wavelength such that the dye undergoes multi-photon absorption of the recoding beam and liner absorption not smaller than 1.5% per recording layer to generate heat, whereby the polymer binder undergoes a change of shape and thus an interface between the recording layer and the intermediate layer undergoes a change of shape to record information.

In this recording method, it is preferable that the recording beam has a wavelength which causes the dye to undergo linear absorption not more than 5% per recording layer.

Further, it is preferable that the recording beam has a wavelength which causes a two-photon absorption cross-section of the dye to be not smaller than 10 GM.

Further, the interface may stick out into the intermediate layer to form a protrusion. In this instance, it is preferable that the protrusion sticks out in the range of 1-300 nm from a position of the interface before undergoing a change in shape. Information is readily readable if the protrusion sticks out in the range of 1-300 nm.

Other aspects and advantages of the present invention will become apparent from the following description taken in conjunction with the accompanying drawings.

BRIEF DESCRIPTION OF THE DRAWING

FIG. 5 includes views (a) to (c) explaining a process of forming a recess portion in the conventional optical information recording medium.

FIG. 6 is a table showing the results of experiments.

DESCRIPTION OF EMBODIMENTS

One exemplified embodiment of the present invention will be described below with reference to the drawings.

Figure 1:
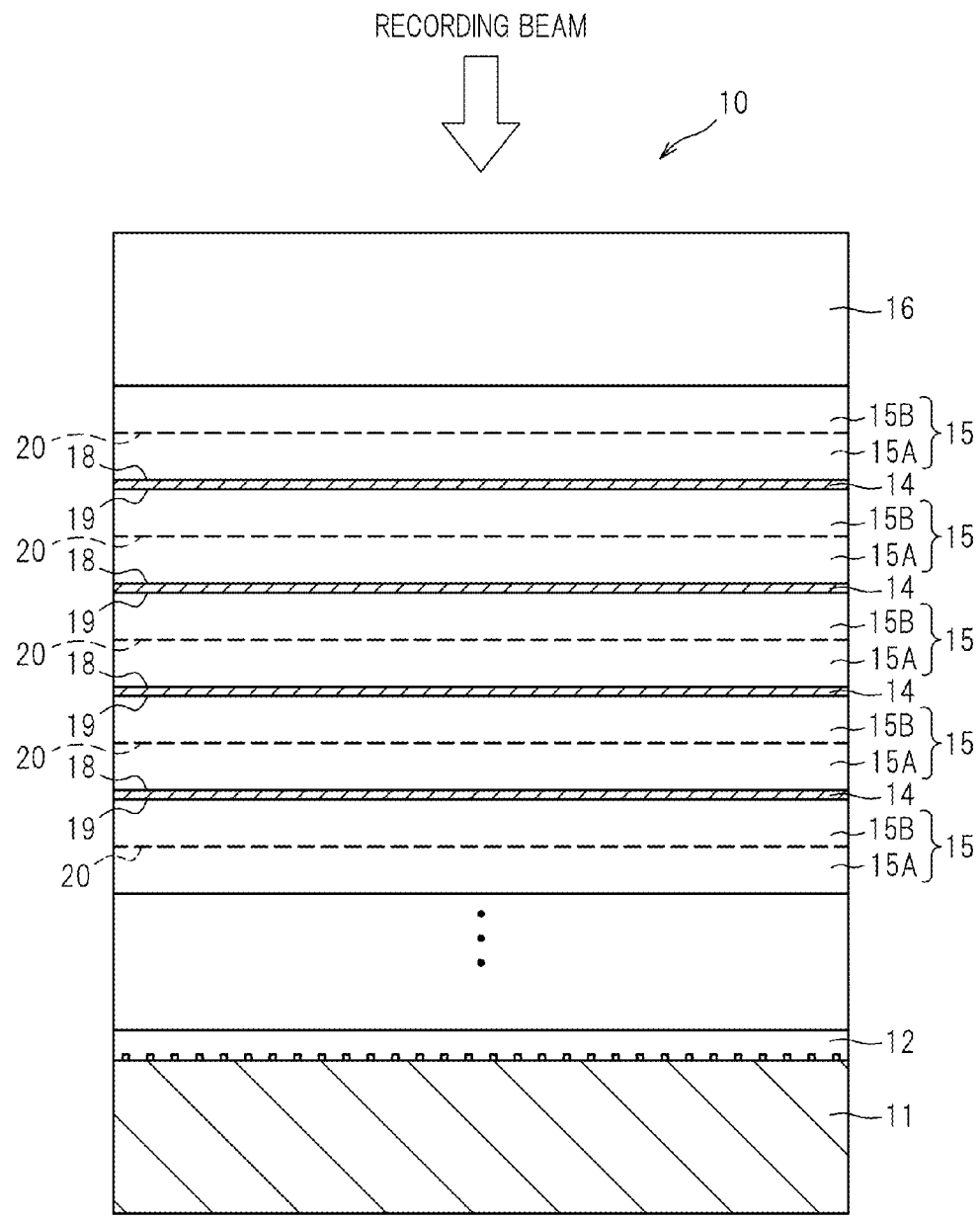
FIG. 1 is a sectional view of a multi-layered optical information recording medium.

As seen in FIG. 1, an optical information recording medium 10 comprises a substrate 11, a servo signal layer 12, a plurality of recording layers 14, a plurality of intermediate layers 15 (first intermediate layers 15A and second intermediate layers 15B), and a cover layer 16. In this embodiment, the interface between the recording layer 14 and the first intermediate layer 15A is referred to as a "near-side interface 18", and the interface between the recording layer 14 and the second intermediate layer 15B is referred to as a "far-side interface 19." Further, the interface between the first interface 15A and the second interface 15B is referred to as an "intermediate interface 20."

The substrate 11 is a support member for supporting the recording layers 14 and other layers. As an example, the substrate 11 is a circular plate made of polycarbonate. The material and the thickness of the substrate 11 are not specifically limited.

The servo signal layer 12 is made of a tacky or adhesive resinous material and configured to retain the recording layers 14 and the intermediate layers 15 on the substrate 11. A servo signal is previously recorded in the servo signal layer 12 at a surface close to the substrate 11; the servo signal is recorded as an asperity pattern or by utilizing the change in the refractive index. Herein, the servo signal is a previously set signal for assisting a recording and reading apparatus to recognize the servo signal layer 12 as a focus reference surface during recording and reading out the information. To bring the focus on a predetermined recording layer 14, focus control is performed taking into account the distance from the reference surface and the number of interfaces. Further, to accurately irradiate the track of the circumferentially arranged recording spots with a laser beam at the time of recording and reading out the information, it is preferable that a tracking servo signal or a groove for tracking is previously provided. It is to be noted that the presence or absence of the servo signal layer 12 is optional.

The recording layer 14 is made of a photosensitive material on which information is optically recordable; in this embodiment, the recording layer 14 contains a polymer binder and dye dispersed in the polymer binder. When the recording layer 14 is irradiated with a recording beam, the dye absorbs the recording beam and generates heat. The polymer binder undergoes a change in shape by the generated heat, so that the near-side interface 18 undergoes a change in shape and sticks out into the first intermediate layer 15A to form a protrusion, whereby information is recorded in the recording layer 14. To be more specific, each protrusion is formed, as will be described later, such that the center portion thereof has a shape protruding from the recording layer 14 into the first intermediate layer 15A, and the protrusion is surrounded by a recess portion which is recessed from the first intermediate layer 15A into the recording layer 14; the recess portion has a recess shape when considering the recording layer 14 as a reference.

For this reason, each recording layer 14 is thicker than the conventional recording layer (see the after-mentioned example in which a recessed shape is formed) containing a polymer binder and dye, and the thickness of the recording layer 14 is not less than 50 nm. The thickness of each recording layer 14 is in the range of 50 nm to 5 μm, preferably in the range of 100 nm to 3 μm, and more preferably in the range of 200 nm to 2 μm. If the thickness is less than 50 nm, the interface between the recording layer 14 and the intermediate layer 15 (corresponding to the near-side interface 18 or the far-side interface 19 in this embodiment) deforms such that a recessed shape is formed in the interface when considering the recording layer 14 as a reference. On the contrary, if the thickness is not less than 50 nm, the interface deforms such that a protrusion is formed at a center of the recorded portion. Although the thickness of the recording layer 14 does not have an upper limit, it is preferable that the thickness thereof is not more than 5 μm in order to increase the number of recording layers 14 as many as possible. However, the recording layer according to the present invention may have a thickness less than 50 nm.

In this embodiment, as an example, the number of recording layers 14 provided is approximately from 2-100 layers. To increase the storage capacity of the optical information recording medium 10, a large number of recording layers 14, for example, 10 or more recording layers 14 are preferable. Further, the refractive index of the recording layer 14 may or may not change before and after recording.

It is preferable that the recording layer 14 has an absorption ratio (of one-photon absorption) with respect to the recording beam equal to or less than 5% per one layer. Further, it is more preferable that this absorption ratio is equal to or less than 2%. This is because, for example, if the intensity of the recording beam which reaches the farthermost recording layer 14 has to be equal to or more than 50% of the intensity of the radiated recording beam, it is necessary that the absorption ratio per one recording layer is equal to or is less than 2% in order to obtain thirty-layered recording layers. If the absorption ratio is higher, the recording layer 14 is subject to be overheated and a protrusion is less likely to be formed in the near-side interface 18. This absorption ratio is adjustable by changing the content of the dye and the thickness of the recording layer 14.

The recording layer 14 may be formed by any conventional method; for example, a dye material and a polymer binder are dissolved in a solvent, followed by spin coating with the obtained liquid to form a recording layer 14. Examples of the solvent may include dichloromethane, chloroform, methyl ethyl ketone (MEK), acetone, methyl isobutyl ketone (MIBK), toluene, and hexane.

Specific examples of the polymer binder used for the recording layer 14 may include polyvinyl acetate (PVAc), polymethylmethacrylate (PMMA), polyethylmethacrylate, polybutylmethacrylate, polybenzylmethacrylate, polyisobutylmethacrylate, polycyclohexylmethacrylate, polycarbonate (PC), polystyrene (PS), polyvinyl chloride (PVC), and polyvinyl alcohol (PVA).

The recording beam-absorbing dye used for the recording layer 14 is a dye subject to both linear absorption and multi-photon absorption of light in the wavelength of the recording beam, which linear absorption is not smaller than 1.5% per recording layer. It is preferable that the recording layer 14 has linear absorption not smaller than 1.7% per recording layer, and it is further preferable that the recording layer 14 has linear absorption not smaller than 2.5% per layer.

As for the efficiency of two-photon absorption, it is preferable that the two-photon absorption cross-section is not smaller than 10 GM. Herein, the two-photon absorption cross-section represents the likelihood of two-photon absorption, and is normally expressed in the unit GM (1 GM=1× $10^{-50}$ cm$^4$s photon$^{-1}$) named in the honor of Goeppert-Mayer, who worked out two-photon absorption based on the theory. The two-photon absorption cross-section can be confirmed by the following method.

<Two-Photon Absorption Cross-Section Measurement Method>

Measurement of two-photon absorption cross-section is described as a Z-scan method in MANSOOR SHEIK-BAHAE et al., *IEEE. Journal of Quantum Electronics*, 1990, Vol. 26, from page 760. The Z-scan method is a widely-used method for measuring nonlinear optical constant, wherein a measurement sample is moved along a laser beam in the vicinity of the focal point of the condensed laser beam to record a change in the quantity of transmitted light. Since the power density of the incident light changes in accordance with the position of the sample, if nonlinear absorption occurs, the quantity of transmitted light is attenuated in the vicinity of the focal point. The two-photon absorption cross-section is calculated by fitting the change in the quantity of transmitted light into a theoretical curve expected from the intensity of the incident light, the spot size of the condensed light, the thickness of the sample, the concentration of the sample, and the like. A titanium-sapphire pulsed laser in combination with a regenerative amplifier and an optical parametric amplifier (100 fs pulse width, 80 MHz pulse repetition frequency, 1 W average power output, and 100 kW peak power) is used as a light source for measuring two-photon absorption cross-section. A solution that is prepared by dissolving a compound in chloroform at a concentration of $1\times10^{-3}$ is used as the sample for measuring two-photon absorption.

To be more specific, it is preferable that, for example, the following compound A is used as the compound which undergoes both two-photon absorption and linear absorption in response to application of the recording beam. This is because the following compound A appropriately undergoes two-photon absorption and linear absorption at the wavelength of 405 nm for the currently widely used blue-violet laser.

Compound A

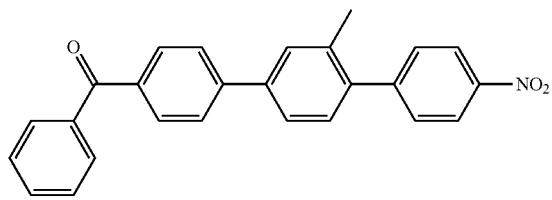

[Chem. 2]

As an example, the compound A can be synthesized by the following procedure.

[Chem. 3]

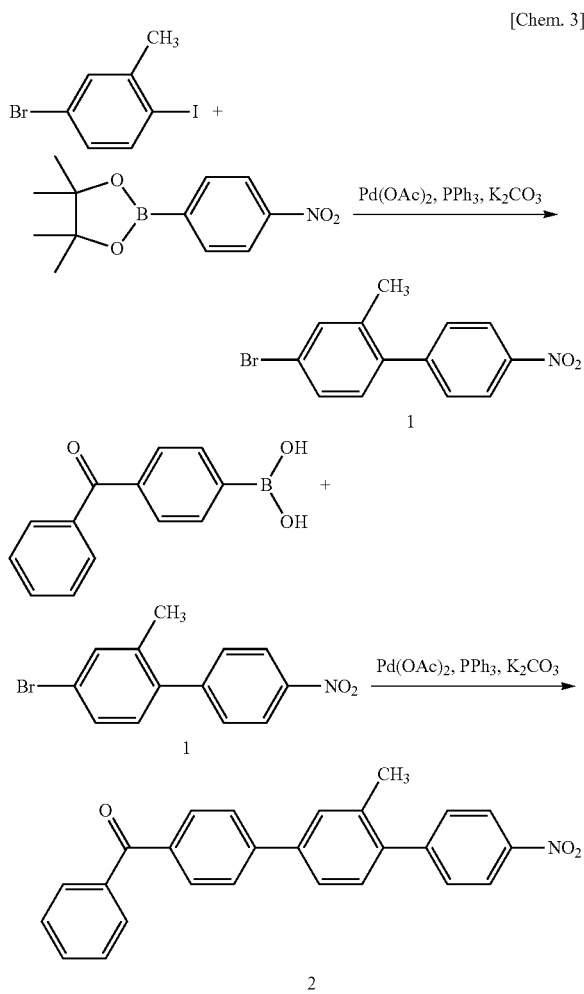

<Synthesis of Compound 1>

2.97 g (10 mmol) of 5-bromo-2-iodotoluene, 2.74 g (11 mmol) of p-nitrophenyl boronic acid pinacolic ester, 112 mg (0.5 mmol) of palladium acetate, 262 mg (1 mmol) of triphenylphosphine, 4.15 g (30 mmol) of potassium carbonate were added to a solvent consisting of 45 ml of 1,2-dimethoxyethane and 16 ml of distilled water, followed by refluxing under nitrogen stream for 5 hours. After cooling, distilled water was added and extraction with ethyl acetate was carried out. Thereafter, the organic phase was separated and the separated organic phase was dried with magnesium sulfate. The crude product was refined by column chromatography (ethyl acetate/hexane=1/10) to obtain 0.8 g (yield 28%) of raw material compound 1.

<Synthesis of Compound 2>

Subsequently, 0.8 g (2.7 mmol) of raw material compound 1 that has been synthesized as above, 0.56 g (2.5 mmol) of 4-benzoyl phenylboronic acid, 38 mg (0.17 mmol) of palladium acetate, 94 mg (0.36 mmol) of triphenylphosphine, 1.4 g (10.2 mmol) of potassium carbonate were added to a solvent consisting of 15 ml of 1,2-diethoxymethane and 10 ml of distilled water, followed by refluxing under nitrogen stream for 15 hours. After cooling, distilled water was added and extraction with ethyl acetate was carried out. Thereafter, the organic phase was separated and the separated organic phase was dried with magnesium sulfate. The crude product was refined by column chromatography (ethyl acetate/hexane=1/10) to obtain 0.63 g (yield 64%) of white solid compound 2 (the aforementioned compound A). The obtained compound was examined by a mass spectrum and $^1$H NMR spectrum to check whether it was the target compound A, and it was determined as the target compound A.

$^1$H NMR (chloroform-$d_3$): 2.4 (s, 3H), 7.35 (d, 1H), 7.6 (m, 7H), 7.75 (d, 2H), 7.85 (d, 2H), 7.95 (d, 2H), 8.3 (d, 2H).

When the compound A is used, a pulsed laser beam having a wavelength of 405 nm may be used as the recording beam. The two-photon absorption cross-section of the compound A is 110 GM for this recording beam.

The intermediate layer 15 is provided between the recording layers 14. In other words, intermediate layers 15 are provided at positions adjacently above and below each of the recording layers 14. In order to prevent crosstalk across a plurality of recording layers 14 (i.e., phenomenon in which a signal from one recording layer 14 is mixed with another signal is from an adjacent recording layer 14), the intermediate layer 15 is provided to form a predetermined amount of space between the adjacent recording layers 14. For this purpose, the thickness of the intermediate layer 15 is equal to or more than 3 μm. As an example, the intermediate layer 15 is 10 μm thick in this embodiment.

Each (one) intermediate layer 15 includes a first intermediate layer 15A, and a second intermediate layer 15B adjacent to and disposed at the upper side of the first intermediate layer 15A. The first intermediate layer 15A is adjacent to the upper side of the recording layer 14, on which the recording beam is incident, and the second intermediate layer 15B is adjacent to the lower side of the recording layer 14 that is the opposite side of the upper side.

The first intermediate layer 15A and the second intermediate layer 15B are made of materials which are unreactive to irradiation with a laser beam at the time of recording and reading out the information. Further, in order to minimize the loss of the recording beam, the reading beam, and the readout beam (light including a regeneration signal generated by irradiation with the reading beam), it is preferable that the first intermediate layer 15A and the second intermediate layer 15B are made of resin which is transparent to the recording beam, the reading beam, and the readout beam. Herein, the term "transparent" indicates that the absorption ratio determined by taking into consideration the absorption ratio of the first intermediate layer 15A and the absorption ratio of the second intermediate layer 15B is equal to or less than 1%.

As seen from a direction from which the recording beam and other beams enter the recording layer 14 (i.e., from upper side of FIG. 1), the first intermediate layer 15A is adjacent to and disposed at the upper side (near side) of the recording layer 14. The refractive index of the first intermediate layer 15A is different from that of the recording layer 14. Accordingly, reflection of the reading beam derived from an abrupt change in the refractive index occurs at an interface (near-side interface 18) between the recording layer 14 and the first intermediate layer 15A. It is preferable that the refractive index of the first intermediate layer 15A be different to some appropriate degree from that of the recording layer 14. To be more specific, it is preferable that the following relation is satisfied:

$$0.001 < ((n2-n1)/(n2+n1))^2 < 0.04$$

where n1 is a refractive index of the recording layer 14, and n2 is a refractive index of the first intermediate layer 15A.

If $((n2-n1)/(n2+n1))^2$, that is, the reflectivity is greater than 0.001, the quantity of the light reflected at the near-side interface 18 is large, so that a high signal-to-noise ratio is obtained at the time of reading the information. If the reflectivity is smaller than 0.04, the quantity of the light reflected at the near-side interface 18 is restricted to an appropriately small degree, so that the record/readout beam can reach far deeper recording layers 14 without considerable attenuation upon recording and reading out the information. This makes it possible to achieve high storage capacity of the optical information recording medium 10 by providing a large number of recording layers 14.

As an example, the refractive index n2 of the first intermediate layer 15A is 1.61. If the refractive index n1 of the recording layer 14 is 1.40, $((n2-n1)/(n2+n1))^2$ is 0.0049 and the aforementioned inequality expression is satisfied.

In this embodiment, the first intermediate layer 15A is softer than the recording layer 14. To be more specific, for example, the glass transition temperature of the first intermediate layer 15A is lower than that of the recording layer 14. As an alternative example, the recording layer 14 and the first intermediate layer 15A may be a solid layer and a tacky layer, respectively. These configurations may be obtained by appropriately selecting the polymer binder (resin) used as a material for the recording layer 14 and resin used as a material for the first intermediate layer 15A.

According to the configuration in which the first intermediate layer 15A is softer than the recording layer 14, when the recording layer 14 is heated and expanded by the recording beam, the first intermediate layer 15A is easily deformable to facilitate the deformation of the near-side interface 18.

As seen from the direction from which the recording beam or other beam enters the recording layer 14, the second intermediate layer 15B is adjacent to and disposed at the lower side (far side) of the recording layer 14. The refractive index of the second intermediate layer 15B is substantially the same as that of the recording layer 14. According to the present invention, it is preferable that the reflectivity observed at the interface (far-side interface 19) between the recording layer 14 and the second intermediate layer 15B is sufficiently smaller than that observed at the near-side interface 18. In other words, it is preferable that the difference of refractive indices between the second intermediate layer 15B (which forms the far-side interface 19 where no protrusion is formed) and the recording layer 14 is smaller than the difference of refractive indices between the first intermediate layer 15A (which forms the near-side interface 18 where protrusions are formed) and the recording layer 14. If the light reflected from the far-side interface 19 and the light reflected from the near-side interface 18 interfere with each other, the reproduction output would be higher or lower in accordance with a change in the thickness of the recording layer 14. Such fluctuation in the reproduction output shows that even an extremely small error (e.g., a fraction of the wavelength of the readout beam or less) is not permitted in the thickness of the recording layer 14. And it is very difficult to manufacture an actual medium such that recording layers 14 having, for example, 1 μm thick are accurately and uniformly formed so as not to cause any fluctuation in the reproduction output as described above. From this point of view too, it is desirable that the reflectivity at the far-side interface 19 is sufficiently smaller than that at the near-side interface 18.

From the view point described above, in the present invention, the reflectivity at the far-side interface 19 is equal to or less than one-fifth of the reflectivity at the near-side interface 18, preferably equal to or less than one-tenth, and most preferably, the reflectivity at the far-side interface 19 is 0. To satisfy this condition, it is necessary that the recording layer 14 and the second intermediate layer 15B have substantially the same refractive index. To be more specific, "the refractive index is substantially equal" in this specification means that the difference between the refractive index of the recording layer 14 and the refractive index of the second intermediate layer 15B is equal to or less than 0.05, preferably equal to or less than 0.03, more preferably equal to or less than 0.01, and most preferably, the difference between them is 0. Accordingly, reflection derived from an abrupt change in the refractive index does not occur at the far-side interface 19, so that the record/readout beam is allowed to pass though the far-side interface 19 without reflection.

In order to make the difference between the refractive index of the recording layer 14 and the refractive index of the second intermediate layer 15B smaller and preferably to 0, the composition of the material for the recording layer 14 and the composition of the material for the second intermediate layer 15B can be adjusted. To be more specific, since the material for the recording layer 14 contains dye such as a two-photon absorption compound to be mixed in a polymer binder, the dye or the polymer binder may be selectively adjusted to have an appropriate refractive index and to vary the composition ratio, whereby the refractive index of the recording layer 14 can be optionally adjusted. The refractive index of the polymer binder varies depending on the degree of polymerization even if they have similar basic components. For this reason, the refractive index of the recording layer 14 can also be adjusted using polymer binders with different degrees of polymerization or by adjusting the degree of polymerization of the polymer binder. Further, the refractive index of the recording layer 14 can be adjusted by mixing a plurality of polymer binders. Further, a refractive index matching material (inorganic particulate and the like) may be added to adjust the refractive index of the recording layer 14.

To adjust the refractive index of the second intermediate layer 15B, the degree of polymerization of the polymer material such as resin usable as the material for the second intermediate layer 15B may be adjusted. As an alternative, to adjust the refractive index of the second intermediate layer 15B, a material usable for the intermediate layer 15 may be optionally added or a refractive index matching material (inorganic particulate and the like) may be added.

In this embodiment, the second intermediate layer 15B may have a hardness equal to or higher than the recording layer 14. To be more specific, the second intermediate layer 15B may be formed such that a glass transition temperature thereof is equal to or higher than the glass transition temperature of the recording layer 14. This configuration is achieved by appropriately selecting a resin usable as the material for the recording layer 14 and a resin usable as the material for the second intermediate layer 15B.

It is preferable that the first intermediate layer 15A and the second intermediate layer 15B, by which one intermediate layer 15 is formed, are merged with each other at the interface (intermediate interface 20) therebetween, whereby the refractive index gradually changes at this interface. Namely, an interface is not clearly formed at the intermediate interface 20. Accordingly, reflection derived from an abrupt change in the refractive index does not occur at the intermediate interface 20, so that the record/readout beam is allowed to pass though the intermediate interface 20 without reflection.

This configuration of the interface where the first intermediate layer 15A and the second intermediate layer 15B are merged with each other can be obtained, for example, by mixing a light curing resin into the first intermediate layer 15A and the second intermediate layer 15B and hardening these layers. In this process, the material for the second intermediate layer 15B is applied after the material for the first intermediate layer 15A is applied and before the material is caused to cure to provide the first intermediate layer 15A, so that subsequent irradiation with light hardens and provides the first intermediate layer 15A and the second intermediate layer 15B at the same time.

In this embodiment, the intermediate layer 15 consists of two layers including the first intermediate layer 15A and the second intermediate layer 15B. However, three or more layers may be formed to gradually change the refractive index in the intermediate layer 15. As an alternative, only one intermediate layer 15 may be provided, in which the refractive index gradually changes.

The cover layer 16 is provided to protect the recording layers 14 and the intermediate layers 15 (first intermediate layers 15A and second intermediate layers 15B). The cover layer 16 is made of a material which allows the record/readout beam to pass through the cover layer 16. The cover layer 16 has an appropriate thickness in the range from several tens micro meters to several millimeters.

Figure 2:
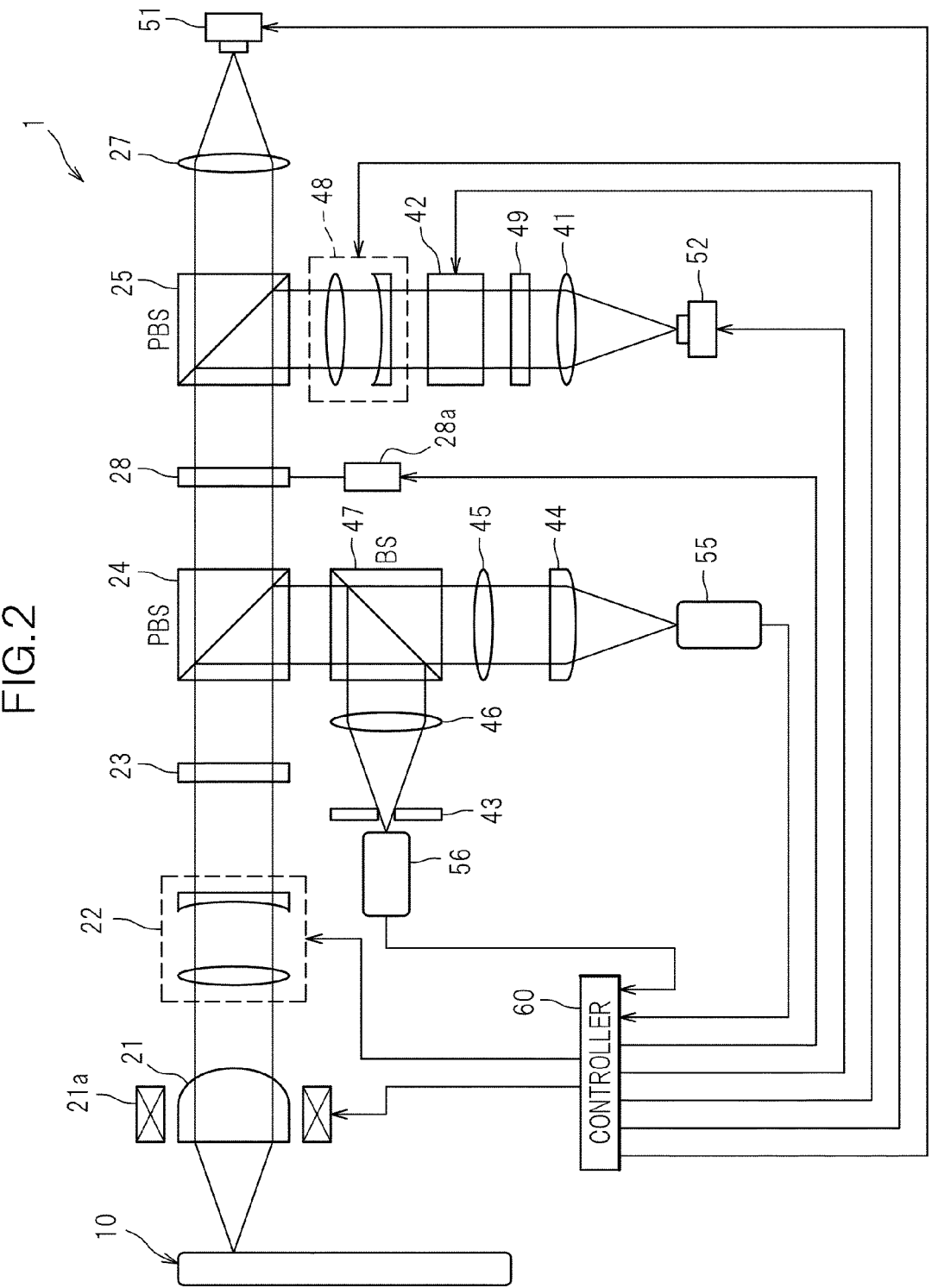
FIG. 2 is a diagram showing the structure of a recording and reading apparatus.

When information is recorded in and read out from the optical information recording medium 10 as described above, for example, the following recording and reading apparatus 1 can be used. As seen in FIG. 2, the recording and reading apparatus 1 includes an objective lens 21 facing the optical information recording medium 10. In the recording and reading apparatus 1, a beam expander 22 for correcting aberration, a quarter-wave plate 23, a PBS (polarizing beam splitter) 24, a half-wave plate 28, a PBS 25, a collimating lens 27, and a reading laser 51 are arranged in this order on an optical axis of the objective lens 21, from the objective lens 21 toward an upstream side of the direction from which light is emitted.

A BS (beam splitter) 47 is arranged on the line that passes through the PBS 24 and perpendicularly intersects the optical axis of the objective lens 21. A ray of light split by the PBS 24 and going into the BS 47 is split into two rays, of which one travels straight forward through the BS 47 and the other one is reflected by the BS 47. In one direction in which the split ray of light travels straight forward through the BS 47, a condensing lens 45, a cylindrical lens 44 and a focusing beam receiving element 55 are arranged in this order. In the other direction in which the split ray of light reflected by the BS 47 travels, a condensing lens 46, a pinhole plate 43, and a readout beam receiving element 56 are arranged in this order. Further, a beam expander 48, a modulator 42, a half-wave plate 49, a collimating lens 41, and a recording laser 52 are arranged in this order on the line that passes through the PBS 25 and perpendicularly intersects the optical axis of the objective lens 21.

The objective lens 21 condenses the recording beam and the reading beam on one of the plurality of recording layers 14. The objective lens 21 is moved in the optical axis direction by a focus actuator 21a which is driven under control of a controller 60, so as to bring the beam into focus on a desired recording layer 14.

The beam expander 22 is an optical element controlled by the controller 60 and causes light incident on the objective lens 21 to converge or diverge to correct spherical aberration generated in accordance with a change in the depth of the target recording layer 14 for recording and reading information from the surface of the optical information recording medium 10.

The quarter-wave plate 23 is an optical element for converting linearly-polarized light into circularly-polarized light and circularly-polarized light into linearly-polarized light in accordance with the rotational direction thereof. Upon reading out the information, the quarter-wave plate 23 makes the direction of the linearly-polarized light of the reading beam and the direction of the linearly-polarized light of the readout beam different by 90 degrees.

Each PBS 24, 25 is an optical element for reflecting and separating particular polarized light. The PBS 24 allows the recording beam emitted from the recording laser 52 and the reading beam emitted from the reading laser 51 to pass therethrough toward the optical is information recording medium 10 and reflects the readout beam returned from the optical information recording medium 10 toward the BS 47.

The BS 47 is an optical element for splitting light with a predetermined splitting ratio irrespective of the polarization state of the light. The readout beam directed from the PBS 24 is split at the BS 47 and distributed to the focusing beam receiving element 55 and the readout beam receiving element 56.

The PBS 25 is arranged to reflect the recording beam while allowing the reading beam to pass therethrough, so that the recording beam incident on the PBS 25 from side is directed toward the optical information recording medium 10.

The reading laser 51 is a 405 nm-CW (Continuous Wave) laser. In order to preferably narrow a beam to have a diameter equal to or smaller than the recoding spot, it is preferable that the reading laser 51 is used which emits a laser beam having a wavelength equal to or shorter than that of the laser beam emitted from the recording laser 52. The output of the reading laser 51 is controlled by the controller 60.

It is to be noted that the modulation of the signal using the recording and reading method according to this embodiment does not utilize interference effect of reflected lights reflected at upper and lower interfaces of the recording layer 14, so that even if a laser with a short coherence length (coherence length shows a tendency to indicate how easily interference of light occurs) is used as a light source of the reading beam, a high degree of modulation is obtained. If the coherence length is sufficiently short, it is possible to suppress undesirable decrease in the signal-to-noise ratio due to interference of multiple-reflection beams which would occur at the interfaces of each of the layers in the multi-layered optical information recording medium. As a result, excellent signal regeneration and servo characteristics are obtained. In general, it is known that the coherence length correlates with the full width at half maximum $\Delta\lambda$ of the spectrum of the light emitted from the light source, and this relation is represented by $\lambda^2/\Delta\lambda$, where $\lambda$ is the center wavelength of the light. To obtain sufficiently high resolution, the wavelength of the reading beam is preferably around 400 nm. In this instance, if the light with $\Delta\lambda$ of 8 nm or more is used, the coherence length is 20 µm or less, so that the interference of multiple-reflection lights from the interfaces of respective recording layers 14 is sufficiently decreased.

The recording laser 52 is a pulsed laser with a wavelength of 405 nm, pulse width of 2 psec, and repetition frequency of 76 MHz. To efficiently cause a multi-photon absorption reaction to occur in the recording layer 14, it is preferable that the recording laser 52 is a pulsed laser with the peak power greater than that of the CW laser. The output of the recording laser 52 is controlled by the controller 60.

The modulator 42 removes part of the pulsed laser beam emitted from the recording laser 52 to temporally modulate the pulsed laser beam and encode the information. As an example of the modulator 42, Acousto-Optic Modulator (AOM), Mach-Zehnder (MZ) optical modulator, and other Electro-optic modulators (EOMs) may be used. When Acousto-Optic Modulator or Electro-optic modulator is used as the modulator 42, the laser beam can be turned on and off at extremely higher speeds as compared to a configuration with a mechanical shutter. Operation of the modulator 42 is controlled by the controller outputting to the modulator 42 a signal encoded in accordance with the information to be recorded.

In order to cause the pulsed laser beam emitted from the recording laser 52 to be reflected at the PBS 25, the half wave plate 49 adjusts polarization of the pulsed laser beam.

The half-wave plate 28 is provided to adjust polarization of the CW laser beam emitted from the reading laser 51 and polarization of the pulsed laser beam emitted from the recording laser 52. The half-wave plate 28 is configured to be rotated by an actuator 28a which is driven by the controller 60 such that, during recording the information and during reading the information, the half-wave plate 28 is rotated through 90 degrees around the optical axis. Accordingly, the half-wave plate 28 allows the required one of the recording beam and the reading beam to be transmitted therethrough during the recording and the reading of the information.

The focusing beam receiving element 55 utilizes a quadrant photodetector and is configured to obtain a focus controlling signal by making use of an astigmatic method or the like. To be more specific, focusing is performed by the controller 60 controlling a focus actuator 21a to minimize astigmatism generated after passing through the condensing lens 45 and the cylindrical lens 44.

The readout beam receiving element 56 receives the readout beam including the regenerated information. The signal detected by the readout beam receiving element 56 is output to the controller 60, and then the controller 60 demodulates the signal into the information. Since the light received by the focusing beam receiving element 55 has passed through the cylindrical lens 44, inputting the distribution of light intensity to the controller 60 enables the controller 60 to obtain the controlled variable used for the focusing servo for the recording beam and the readout beam by means of the astigmatic method.

The pinhole plate 43 is arranged in the proximity of the focal point of the light condensed by the condensing lens 46. The pinhole plate 43 constitutes a confocal optical system, whereby the reflected light from a predetermined depth position of the optical information recording medium 10 is allowed to pass through the pinhole plate 43 while the other unnecessary light is cut.

When a desired recording layer 14 of the optical information recording medium 10 is irradiated with the recording beam, the controller 60 performs focusing with a focal position set on the near-side interface 18 or slightly shifted in the depth direction from the near-side interface 18. The fine adjustment of the focusing is performed by moving the objective lens 21 through the focus actuator 21a and by controlling the beam expander 48 arranged on the is path of the recording beam through the controller 60, to thereby adjust converging or diverging of the recording beam. Further, to irradiate a desired recording layer 14 of the optical information recording medium 10 with the reading beam, the controller 60 performs focusing with the near-side interface 18 set as a target.

Other than the constructions described above, the recording and reading apparatus 1 is similar to the conventional optical recording and reading apparatus. For example, in order to record a large number of recording spots M in a plane of a recording layer 14 of the optical information recording medium 10, the recording and reading apparatus 1 includes an actuator for moving the recording beam and the reading beam relative to the optical information recording medium 10 in a planar direction of the recording layer 14.

When the information is recorded using the recording and reading apparatus 1 as described above, in the recording and reading apparatus 1 the recording laser 52 is caused to emit a pulsed laser beam, which is then partly removed by the modulator 42 to encode the information. The information-encoded beam is controlled by the beam expander 48 to adjust converging or diverging of the beam, and then reflected by the PBS 25 and passes through the half-wave plate 28, the PBS 24, the quarter-wave plate 23, and the beam expander 22 in this order, after which the beam is condensed by the objective lens 21. The reading laser 51 is caused to emit a CW laser beam concurrently with the emission of the pulsed laser beam; the CW laser beam passes through the PBS 25 and the PBS 24 and is condensed by the objective lens 21. The CW laser beam returned from the optical information recording medium 10 passes through the objective lens 21, the beam expander 22, and the quarter-wave plate 23 in this order, and is then reflected by the PBS 24 and the BS 47. Thereafter, the reflected CW laser beam passes through the condensing lens 46 and the pinhole plate 43 and enters the readout beam receiving element 56.

Figure 3:
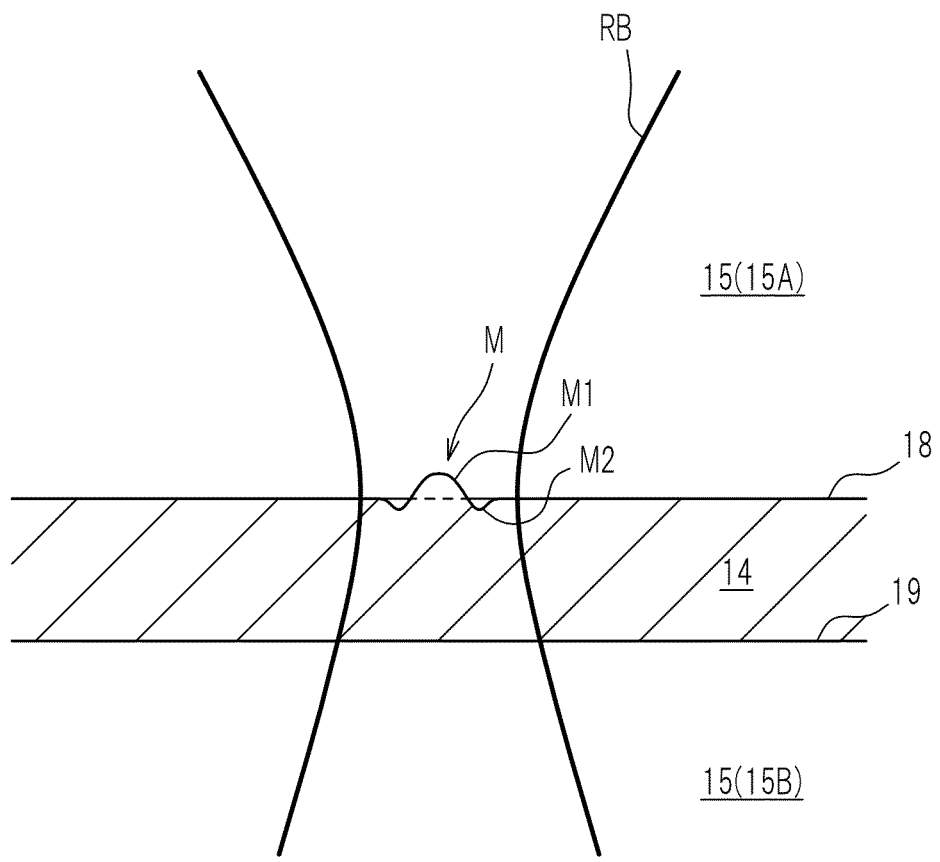
FIG. 3 is a view showing a recording spot formed at the time of recording information.

The controller 60 calculates focal positions of the recording beam and the CW laser is beam based on the signal received from the focusing beam receiving element 55 and drives the focus actuator 21a and the beam expanders 22, 48, so as to adjust the focal position of the recording beam RB (see FIG. 3). This causes the dye in the recording layer 14 to generate heat by the two-photon absorption and the linear absorption, whereby a recording spot M protruding from the recording layer 14 into the first intermediate layer 15A is formed, for example, in the near side interface 18.

More specifically, the recording spot M includes a protrusion M1 at the center portion, and a ring-shaped recess portion M2 surrounding the protrusion M1 and recessed into the recording layer 14. The distance (depth) of the recessed portion M2 from the near-side interface 18 (the near-side interface 18 before undergoing a change in shape) to the deepest portion of the recessed portion M2 is smaller than the distance (height) of the protrusion M1 from the near-side interface 18 (the near-side interface 18 before undergoing a change in shape) to the peak of the protrusion M1. In other words, it can be said that the recording spot M as a whole has a generally protruding shape. Although the principle of formation of the recording spot M having a centrally protruding shape is not elucidated, we assume as follows in comparison with the principle of recess portion formation in the conventionally-known recording method wherein a recessed shape is formed at a center portion of the recording beam-irradiated area (this principle is also based on an assumption).

Explanation is first made on the conventional recording method. According to J. Appl. Phys. 62, 1123 (1987) "Thermal expansion and flow model for pit formation in laser marking of polymeric film optical disks," when a recording material is irradiated with a recording beam, the temperature of the recording material is raised and the recording material (recording layer 14) expands as shown in FIG. 5(*a*) (the hatched area shows a heated region). And as seen in FIG. 5(*b*), the expanding portion outflows due to surface tension. Thereafter, as seen in FIG. 5(*c*), the expanded recording material contracts as the temperature of the recording material lowers, with the result that the outflowing portion which has spilt outside the recording beam-irradiated area forms a protrusion because the recording material remains at a position higher than the reference surface (i.e., the upper surface of the recording layer 14), whereas the center portion of the recording beam-irradiated area forms a recess portion lower than the reference surface because the recording material has flowed out.

In contrast, according to the optical information recording material in this embodiment, the recording material 14 is subject to thermal expansion by irradiation with the recording beam RB, with the result that as with the conventional recording method, the recording layer 14 sticks out as shown in FIG. 5(*a*). However, since the recording layer 14 is relatively thick in this embodiment, the viscosity of the recording layer 14 near the surface of the recording layer 14 is not so low as that of the recording layer 14 in the conventional recording method, and thus outflowing of the recording material such as shown in FIG. 5(*b*) does not occur. Accordingly, it is assumed that when the expanded portion contracts as the temperature of the recording material lowers, the recording beam-irradiated area changes from the shape shown in FIG. 5(*a*) into the shape shown in FIG. 3 such that a protrusion M1 is left at the center and a recess portion M2 is formed to surround the protrusion M1.

To read the information, the recording laser 52 is stopped and the reading laser 51 is driven so that the optical information recording medium 10 is irradiated with the CW laser beam. As with the recording beam, the CW laser beam (readout beam) returned from the optical information recording medium 10 is reflected by the PBS 24 and enters the readout beam receiving element 56 and the focusing beam receiving element 55.

Figure 4:
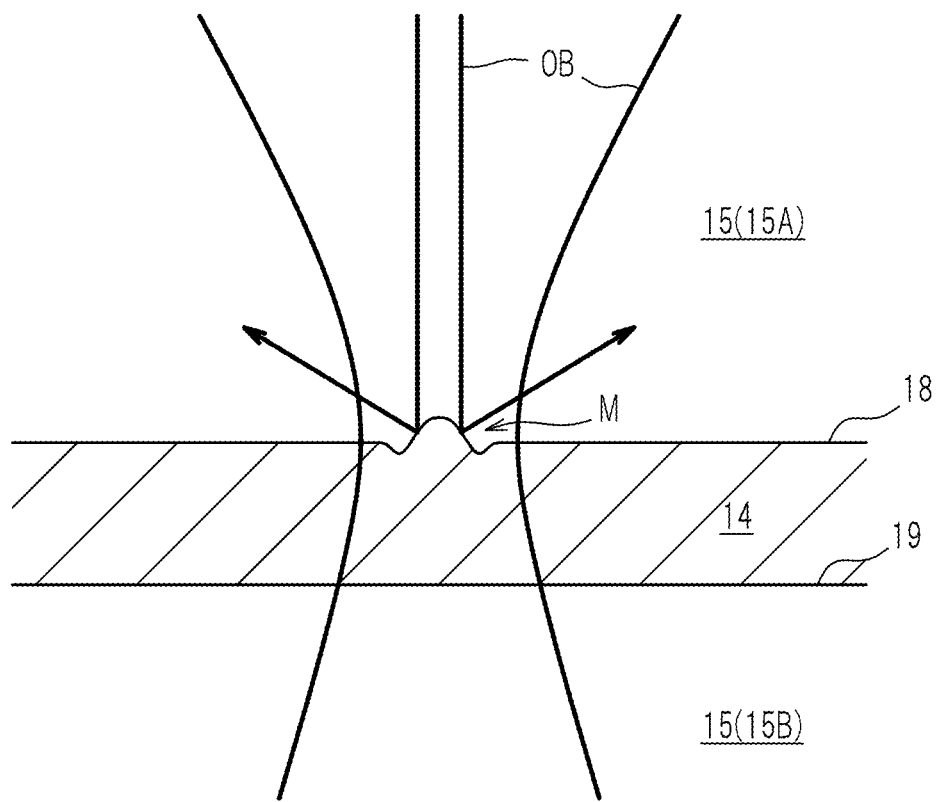
FIG. 4 is a view explaining the process of reading information.

The controller 60 controls the focus actuator 21*a* and the beam expander 22 based on the signal outputted from the focusing beam receiving element 55, and adjusts the focal position with the near-side interface 18 set as the target (see FIG. 4). This can create a difference in light intensity between the light reflected at the portion surrounding the recording spot M in the near-side interface 18 and the light reflected at the recording spot M, because of the difference in the refractive indices at the recording layer 14 and at the first intermediate layer 15A. The recording spot M can be detected from this modulation. In other words, the information can be read out. For the purpose of this optical detection, it is preferable that the protrusion M1 sticks out in the range of 1-300 nm from the position of the interface (near-side interface 18) before undergoing a change in shape.

In this embodiment, since the recording spot M includes the recess portion M2 surrounding the protrusion M1, it is assumed that when the recording spot M is irradiated with the reading beam OB for reading the recording spot M, the light intensity distribution of the reflected light at the recording spot M shows an abrupt change in accordance with the distance from the center of the protrusion M1, as compared to a recording spot M without a recess portion M2 and only including a protrusion M1. This makes it possible to read the recording spot M with high degree of modulation.

To erase the information recorded in the recording layer 14, the recording layer 14 is heated to a temperature around the glass transition temperature of the polymer binder, preferably to a temperature higher than the glass transition point, so that the fluidity of the polymer binder is increased and the deformation in the near-side interface 18 disappears due to surface tension to thereby return to its original flat plane. As a result, the information recorded in the recording layer 14 can be erased. Because the information is erasable, re-recording in the recording layer 14 (repeated recording) can be achieved. When the recording layer 14 is heated for that purpose, the recording layer 14 may be irradiated with a continuous-wave laser beam while bringing the laser beam into focus on the recording layer 14. Heating with a continuous-wave laser beam makes it possible to evenly erase the information recorded in a continuous region within the recording layer 14. The continuous-wave laser used may be the laser used for reading out the information, or alternatively, another laser may be used. In both cases, it is preferable that a laser used emits light having a wavelength absorbable by a one-photon absorption dye.

Further, when the information is to be erased by heating the recording layer 14, the optical information recording medium 10 may be heated as a whole to a temperature higher than the glass transition temperature of the polymer binder so that the information recorded in all the recording layers 14 can be erased at once. Accordingly, irrespective of the kind of dyes contained in the recording layer 14, all the information recorded in the optical information recording medium is easily erased for initialization. Further, when the optical information recording medium is to be disposed of, the information can be easily erased.

As described above, in the optical information recording medium 10 according to this embodiment, one dye contained in the recording layer 14 generates heat by linear absorption (one-photon absorption) and two-photon absorption, whereby recording spots M each having a protruding shape are efficiently formed in the near-side interface 18.

Further, in the optical information recording medium 10 according to this embodiment, the near-side interface 18 protrudes from the recording layer 14 into the first intermediate layer 15A to form protrusions, and unlike the conventional recording method of producing a recess portion, formation of the recording spots M does not require high fluidity to be given to the recording layer 14, which leads to recording with high sensitivity.

Further, in the optical information recording medium 10 according to this embodiment, the recording layer 14 and the second intermediate layer 15B located on both sides of the far-side interface 19 and not involved in reading out the information have substantially the same refractive index, with the result that the reflection of the record/readout beam does not occur at the far-side interface 19 and the recording beam and the reading beam can reach far deeper recording layers 14. Therefore, the number of recording layers 14 can be increased. Further, since the reflection does not substantially occur at the far-side interface 19, the reflected light at the near-side interface 18 and the reflected light at the far-side interface 19 do not interfere with each other during reading of the information. This can improve the signal-to-noise ratio at the time of reading the information.

Although one exemplary embodiment of the present invention has been described above, the present invention is not limited to the above-described embodiment and various changes and modifications may be made where necessary.

For example, in the above embodiment, only the near-side interface 18 undergoes a change in shape by irradiation with the recording beam. However, an alternative configuration may be conceivable such that only the far-side interface 19 undergoes a change in shape so as to protrude into the intermediate layer 15 (second intermediate layer 15B) to form a protrusion. In this case, it is preferable that a relatively soft material (e.g., material softer than the recording layer 14) is used for the second intermediate layer 15B or the recording beam-illuminating position is shifted. Another alternative configuration may also be conceivable such that both of the near-side interface 18 and the far-side interface 19 undergoes a change in shape; however, in terms of ease of reading out the recording spots M, it is preferable that one of the near-side interface 18 and the far-side interface 19 is caused to undergo a change in shape.

Further, in the above embodiment, the intermediate layer 15 consists of two layers including the first intermediate layer 15A and the second intermediate layer 15B. However, the intermediate layer 15 may be a homogenous layer throughout its entire material in the thickness direction thereof.

Further, in the above embodiment, when considering the recording layer 14 as a reference, information is recorded by causing the interface of the recording layer 14 to deform to provide protrusions. However, the interface of the recording layer 14 may be caused to deform to provide recess portions as with the conventionally-known recording method.

Further, according to the above embodiment, the compound A is exemplified as a specific two-photon absorption compound which can be recorded at the wavelength of 405 nm. However, if the recording beam having a wavelength other than 405 nm is used, other multi-photon absorption dyes may be used in the present invention.

EXAMPLES

Description will be given of experiments for recording on and erasing from an optical information recording medium according to the present invention.

1. Recording Material

In these examples, a recording material which contains a polymer binder and dye dispersed in the polymer binder was used.

(1) Polymer Binder

Polyvinyl acetate (from Across Co., Ltd.; Mw: 101600) was used as the polymer binder.

(2) Dye

The following compounds A, B, C were used as dye.

[Chem. 4]

Compound A

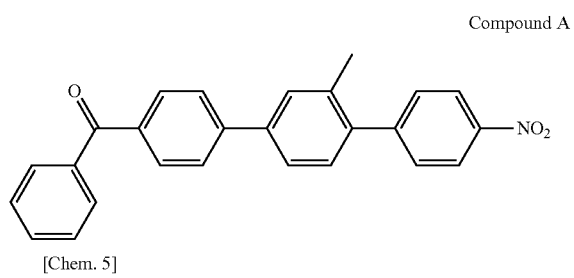

[Chem. 5]

Compound B

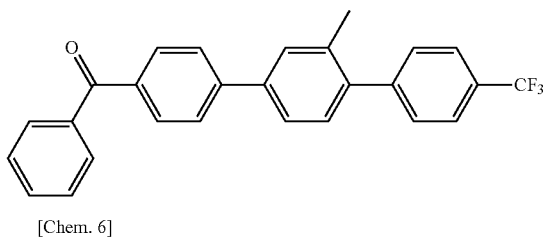

[Chem. 6]

Compound C

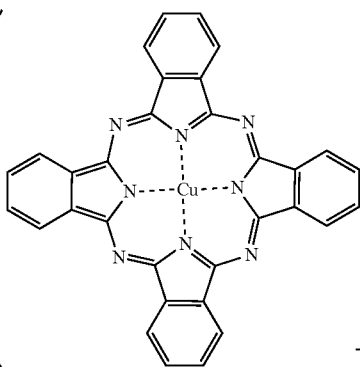

The above compound B was synthesized by the following method:

[Chem. 7]

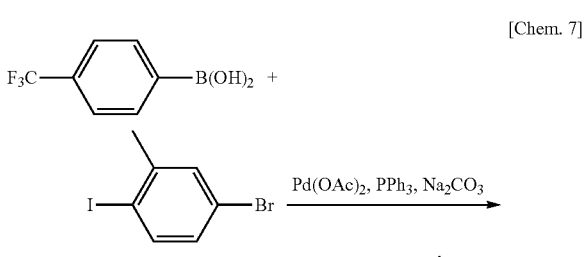

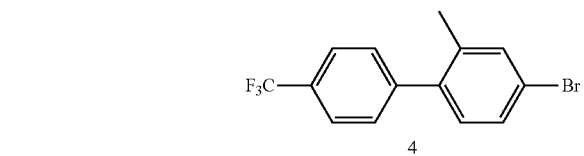

4

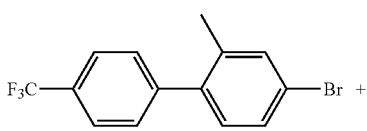

4

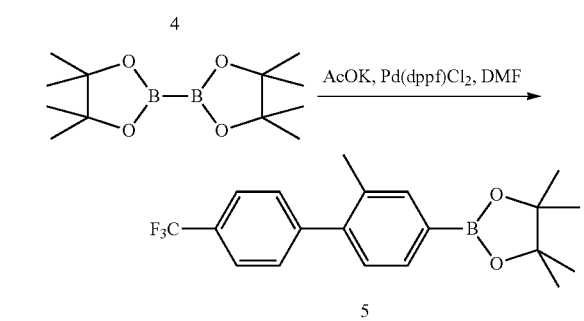

5

-continued

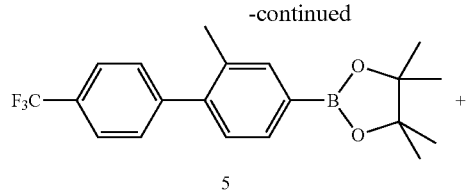

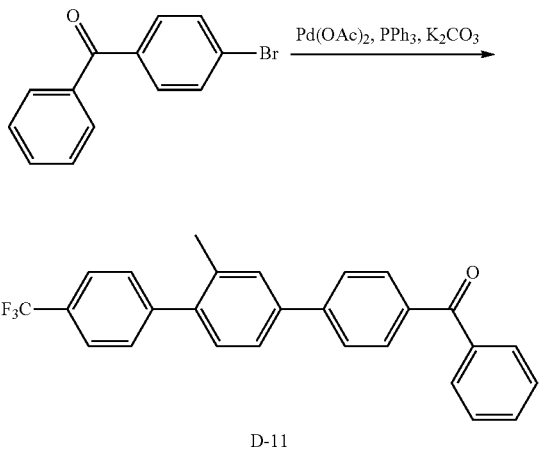

<Synthesis of Raw Material Compound 4>

6.98 g (37 mmol) of p-trifluoromethylphenylboronic acid, 9.92 g (33 mmol) of 5-bromo-2-iodotoluene, and 10.6 g (100 mmol) of sodium carbonate were dissolved in 190 ml of ethylene glycol dimethyl ether-distilled water mixed solvent (14:5), and then 0.37 g (1.7 mmol) of palladium acetate and 0.88 g (3.3 mmol) of triphenylphosphine were added thereto, followed by heating under nitrogen stream for 7 hours.

After letting the reaction solution cool, distilled water and about 600 ml of ethyl acetate were added and extraction was performed. After removing an aqueous layer and separating an organic layer, the organic phase was dried with magnesium sulfate. The filtrate from which magnesium sulfate had been filtered out was evaporated to dryness in a rotary evaporator, and refined by silica gel column (ethyl acetate:hexane=1:400) to obtain 10.1 g (yield: 96%) of white raw material compound 4. The obtained compound 4 was examined by $^1$H NMR spectrum to check whether it was the target compound, and it was determined as the target compound.

<Synthesis of Raw Material Compound 5>

9.5 g (30 mmol) of raw material compound 4, 9.9 g (39 mmol) of bis(pinacolato)diboron, 8.8 g (90 mmol) of potassium acetate, and 0.73 g (0.9 mmol) of [1,1'-bis(diphenylphosphino)ferrocene]dichloropalladium were suspended in 170 ml of DMF, followed by heating under nitrogen stream at 80° C. for 4 hours. After letting the reaction solution cool, distilled water and ethyl acetate were added and extraction was performed. After removing an aqueous layer and separating an organic layer, the organic phase was dried with magnesium sulfate. The filtrate from which magnesium sulfate had been filtered out was evaporated to dryness in a rotary evaporator, and refined by silica gel column (ethyl acetate: hexane=1:100->1:10) to obtain 5.9 g (yield: 54%) of colorless raw material compound 5. The obtained compound 5 was examined by $^1$H NMR spectrum to check whether it was the target compound, and it was determined as the target compound.

<Synthesis of Compound B>

0.8 g (2.2 mmol) of raw material compound 5 and 0.52 g (2.0 mmol) of p-bromobenzophenone were dissolved in 35 ml of ethylene glycol dimethyl ether-distilled water mixed solvent (6:1), and then 22.5 mg (0.1 mmol) of palladium acetate, 52.4 mg (0.2 mmol) of triphenylphosphine, and 0.64 g (6 mmol) of potassium carbonate were added thereto, followed by heating under reflux for 2 hours. After letting the reaction solution cool, distilled water and ethyl acetate were added and extraction was performed. After removing an aqueous layer and separating an organic layer, the organic phase was dried with magnesium sulfate. The filtrate from which magnesium sulfate had been filtered out was evaporated to dryness in a rotary evaporator, and a crude product was obtained. The obtained crude product was refined by silica gel column (ethyl acetate:hexane=1:100->1:5) to obtain 0.71 g (yield 77%) of white crystal. The obtained compound was examined by a mass spectrum and $^1$H NMR spectrum to check whether it was the target compound B, and it was determined as the target compound B.

$^1$H NMR (CDCl$_3$) 2.37 (s, 3H), 7.34 (d, 1H), 7.48-7.55 (m, 7H), 7.7-7.8 (m, 4H), 7.85 (m, 2H), 7.95 (m, 2H)

2. Method of Producing Recording Layer

Dye and a polymer binder were dissolved in a solvent (described later) while stirring to obtain a coating liquid. The coating liquid was applied to a glass substrate by spin coating to form a film on the glass substrate. The thickness of the film was 1 µm. The refractive index of the glass substrate was 1.53.

3. Test and Evaluation Method for Recording and Reading Information

The recording layer was illuminated with a recording beam (pulsed laser beam: wavelength of 405 nm, repetition frequency of 76 MHz, pulse width of 2 psec) with the peak power of 20 W (average power of 1.5 mW). Recording was performed by adjusting the focal position of the recording beam on the recording layer while fixing the power of the recording beam; during the recording, the recording time (irradiation time) was changed in the range from 1 µs to 100 µs.

Reading test was carried out by the following conditions: the recording spots were illuminated with a reading beam using a 405 nm continuous-wave laser (CW laser) with the power of 0.5 mW, and the quantity of the reflected light was read.

Degree of modulation was defined by the following equation and calculated with reference to the experimental results:

Degree of modulation={(Quantity of light reflected at the non-illuminated area)−(Quantity of light reflected at the illuminated area)}/(Quantity of light reflected at the non-illuminated area)

Observation was made on Comparative Example 2 described below using an atomic force microscope (AFM) and a laser microscope. Observation conditions were as follows:

Device: Nano Search Microscope OLS-3500 (manufactured by Olympus Corporation) AFM Measurement Observation conditions: Dynamic mode, Scanning range of 12 µm, Scanning speed of 0.5 Hz, with the use of High-aspect-ratio probe AR5-NCHR-20 (manufactured by Nano-World AG)

Laser Microscope Measurement

Observation conditions: Objective lens×100, Confocal observation

5. Coating Liquid Used to Prepare Recording Layers in Examples and Comparative Examples The coating liquid used for preparation of the recording layer in each of Examples and Comparative Examples contained the following compositions.

Example 1

| Solvent | methyl ethyl ketone (MEK) | 7 g |
|---|---|---|
| Dye | Compound A | 167 mg |
| Polymer binder | polyvinyl acetate (PVAc) (from Across Co., Ltd.; Mw: 101600) | 500 mg |

Example 2

Conditions were the same as those of Example 1, except that the dye was changed as follows:

| Dye | Compound A | 143.5 mg |
|---|---|---|

Example 3

Conditions were the same as those of Example 1, except that the dye was changed as follows:

| Dye | Compound A | 67.5 mg |
|---|---|---|

Comparative Example 1

Conditions were the same as those of Example 1, except that the dye was changed as follows:

| Dye | Compound A | 34.2 mg |
|---|---|---|

Comparative Example 2

Conditions were the same as those of Example 1, except that the dye was changed as follows:

| Dye | Compound B | 215 mg |
|---|---|---|

Comparative Example 3

Conditions were the same as those of Example 1, except that the dye was changed as follows:

| Dye | Compound B | 143.5 mg |
|---|---|---|

Comparative Example 4

Conditions were the same as those of Example 1, except that the dye was changed as follows:

| Dye | Compound B | 71.4 mg |
|---|---|---|

Comparative Example 5

Conditions were the same as those of Example 1, except that the dye was changed as follows:

| Dye | Compound C | 10.7 mg |
|---|---|---|

According to the above formulations, the concentration [wt %] of each of the prepared dye was shown by the table of FIG. 6. In each of these examples, molarity [mol/L] was shown for the purpose of reference. Since two-photon absorption did not occur in Comparative Example 5, molarity was omitted.

Further, the linear absorption [%] of each of the produced recording layers was shown by the table of FIG. 6. The absorption ratio was measured under the following conditions.

Device Ultraviolet and visible spectrophotometer UV-3100PC (manufactured by Shimadzu Corporation.)
Measuring Range: from 250 nm up to 700 nm
Measurement interval: 1 nm Quartz glass was used as the substrate for the recording layer. Baseline measurement was carried out using the quartz glass alone. The absorption ratio was calculated from the absorbance Ab at 405 nm, using the following equation.

$$\text{Absorption ratio [\%]} = 1 - 10^{-Ab}$$

6. Results

With respect to the above Examples and Comparative Examples, configurations and recording time were shown in FIG. 6.

In FIG. 6, the relative recording sensitivity as a parameter of the recording sensitivity is represented by the reciprocal of the time required for formation of the recording spot by which the degree of modulation being 0.2 was obtained; the values of the relative recording sensitivity were shown as relative values with the result of Comparative Example 2 used as a reference (i.e., 1.0). In other words, if the sensitivity was 2, the degree of modulation being 0.2 was obtained in half the time as required in Comparative Example 2.

As in the case of Comparative Example 5 where the dye only undergoing linear absorption in response to application of the recording beam was used in the recording layer, even if the linear absorption was 3.0%, no recording spot was formed. This means that heat sufficient to cause deformation of the interface between the recording layer and the intermediate layer was not generated.

Compound B used in Comparative Examples 2-4 had linear absorption in the range from 0.5 to 0.8%. In terms of the precision of the spectrophotometer, the linear absorption not more than 1% shows poor resolution and indicates that the compound B does not have linear absorption. In other words, it can be said that the compound B substantially undergoes two-photon absorption only. The two-photon absorption cross-section of the compound B was 80 GM. As in the case of Comparative Example 2, even if the molarity was as high as 1.2 [mol/l], the relative recording sensitivity was 1.0.

The linear absorption of the compound A was changed from 1.3 to 3.0%. In the case of Example 1 where the linear absorption was 3.0% and the molarity was 1.0 [mol/1], the relative recording sensitivity of 11.1 was observed.

Figure 7:
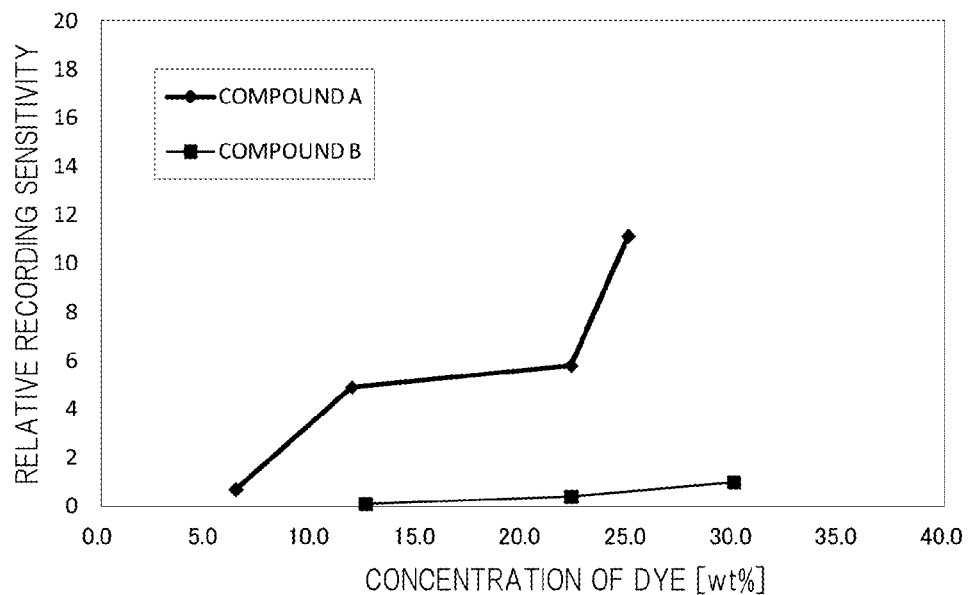
FIG. 7 is a graph showing the relationship between concentration of dye and relative recording sensitivity.
Figure 8:
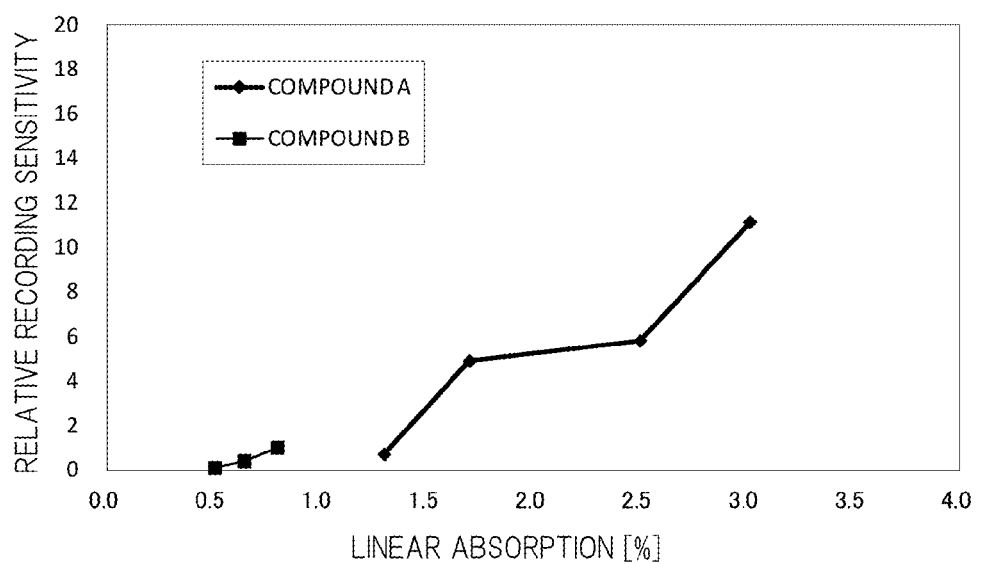
FIG. 8 is a graph showing the relationship between linear absorption and relative recording sensitivity.

The relationships of the relative recording sensitivity observed in these Examples and Comparative Examples with respect to the concentration of the dye and to the linear absorption were shown in FIG. 7 and FIG. 8, respectively. As shown in FIG. 7, in the compound B only undergoing two-photon absorption, the relative recording sensitivity increases roughly proportionally with the increase in the concentration of the dye; whereas in the compound A, the relative recording sensitivity greatly increases from 6.4 wt % to 11.9 wt % in accordance with the increase in the concentration of the dye. Of course the compound A has higher two-photon absorption cross-section than the compound B does, that is, the compound A is higher in probability of two-photon absorption than the compound B. However, even if the difference of this probability is considered, it can be said that the relative recording sensitivity is extremely high in the compound A. Further, as shown in FIG. 8, increase in the relative recording sensitivity is greatly improved around the boundary where the linear absorption takes a value of approximately 1.5%. These results revealed that, if the linear absorption is raised to approximately 1.5%, a greater heat is generated due to some synergistic interaction between linear absorption and two-photon absorption, so that the recording sensitivity can be improved greatly. Further, it can be understood from FIG. 8 that the recording sensitivity can be improved further due to some synergistic interaction between linear absorption and two-photon absorption, with the linear absorption of more preferably 1.7% or higher, and further preferably 2.5% or higher.

In the above experiments, it was confirmed that the compound A was suitable for use with the recording beam having a wavelength of 405 nm. This does not mean that the compound B is inappropriate as the dye used in the present invention. Since the compound B is also subject to two-photon absorption, if the wavelength of the recording beam is appropriately selected, it is possible that the compound B is used in the present invention. For example, although an appropriate wavelength of the recording beam has not been specified completely under the condition where the compound B is used as the dye, it is assumed that a highly sensitive recording can be performed in the specific wavelength range approximately from 350 to 400 nm because of occurrence of the two-photon absorption and an appropriate linear absorption.

Figure 9:
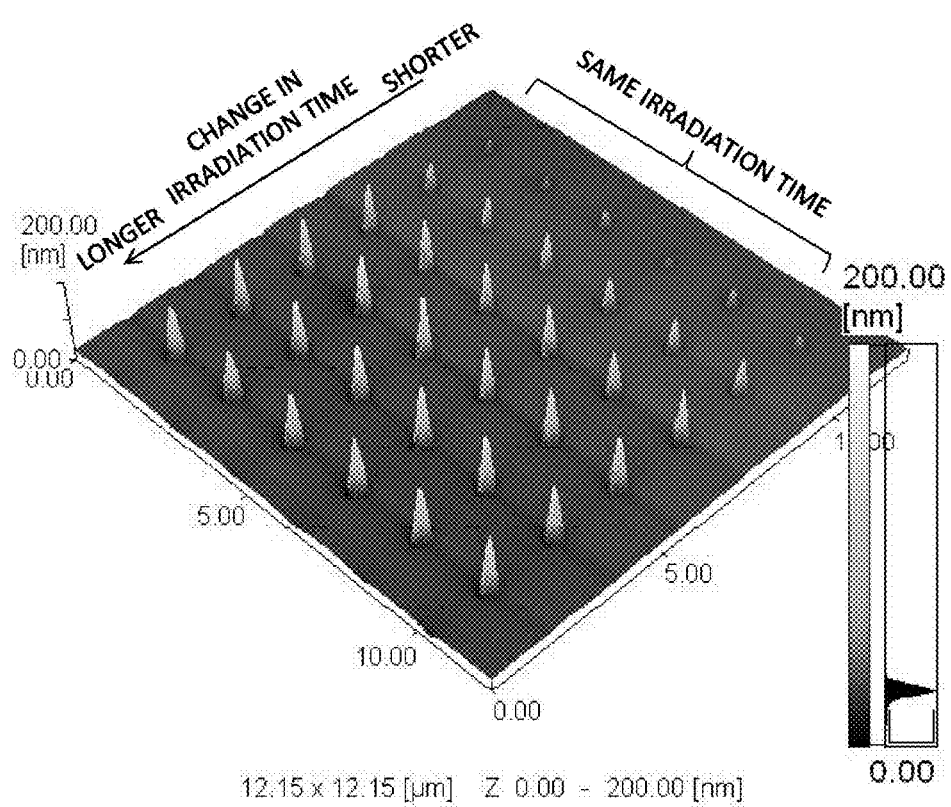
FIG. 9 shows recording spots observed by AFM.
Figure 10:
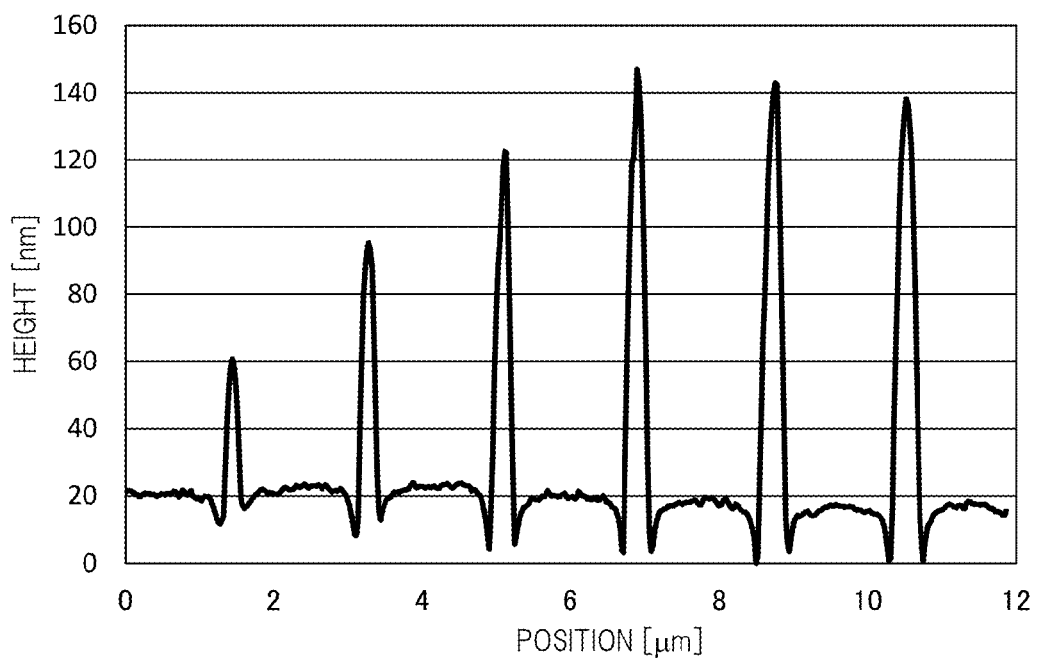
FIG. 10 shows cross-sectional shapes of the recording spots.
Figure 11:
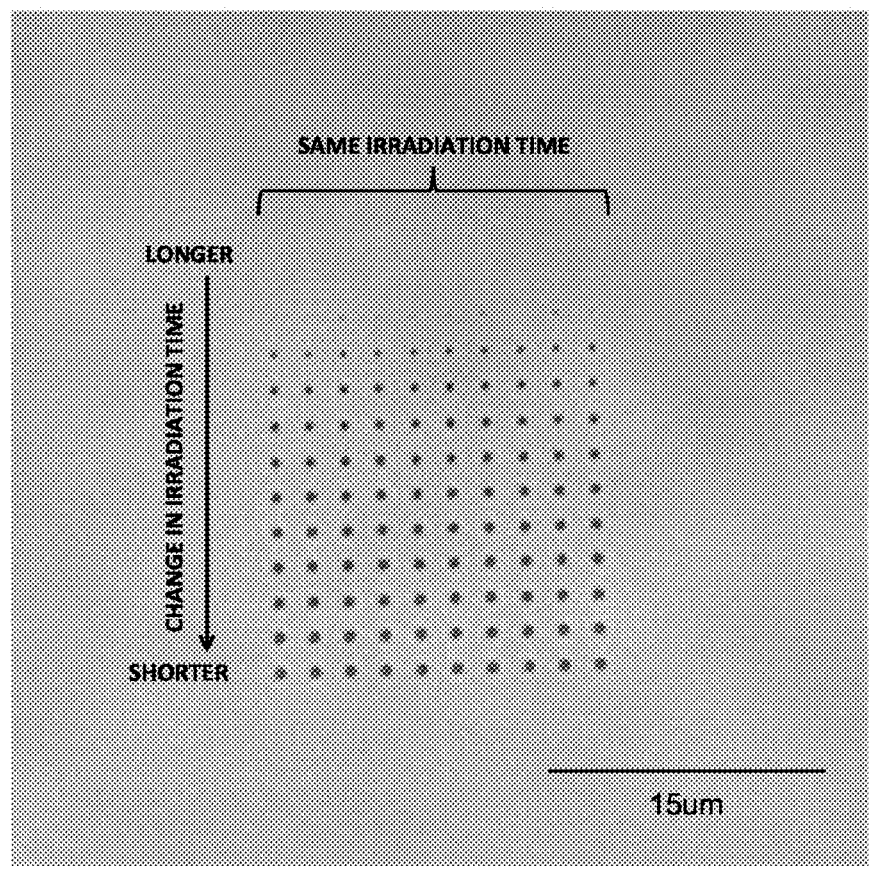
FIG. 11 is an image of the recording spots obtained by a laser microscope.

Shapes of the recording spots recorded in Comparative Example 2 were measured by AFM and the result was shown three-dimensionally in FIG. 9, the cross-sectional shapes thereof were shown in FIG. 10, and the image obtained by a laser microscope was shown in FIG. 11. As seen in FIGS. 9 and 10, each recording spot had a protrusion at its center portion, and the protrusion was surrounded by a recess portion. "Position" shown in the horizontal axis of FIG. 10 corresponds to change in the irradiation time (see FIG. 9); the smaller the value of the position, the shorter is the irradiation time, and the greater the value of the position, the longer is the irradiation time. Further, as seen in FIG. 11, since the recording sports were clearly confirmed by the laser microscope observation, it was revealed that optical reading using a laser could be performed well.

The above observation results were obtained as follows: the cover layer consisting of a polycarbonate layer (polycarbonate film) having 80 μm thick and a tackiness layer (tackiness agent) having 18 μm thick was attached to the recording layer to carry out the recording test, and thereafter the cover layer was removed for observation. With respect to the recording conditions, the irradiation time was changed as described above in 3. Further, although not shown in here, in other examples and other comparative examples, recording spots having similar shapes but with different recording sensitivity were observed.

What is claimed is:

1. An optical information recording medium comprising;
a plurality of recording layers each containing a recording material; and
intermediate layers each provided between the recording layers,
wherein the recording material comprises a polymer binder and a dye dispersed in the polymer binder and having a structure represented by the following formula:

[Chem. 1]

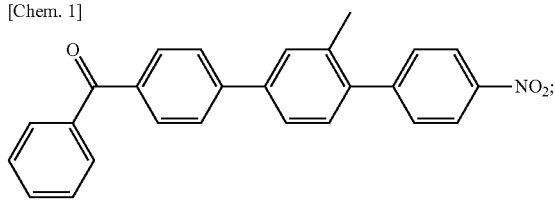 [SMILES: Cc1cc(-c2ccc(C(=O)c3ccccc3)cc2)ccc1-c1ccc([N+](=O)[O-])cc1]

wherein a concentration of the dye in the recording material is in the range of 11.9-25.0 weight percent; and
wherein each of the recording layers is configured such that when the recording layer is irradiated with a laser beam as a recording beam, the dye generates heat by multi-photon absorption of the recording beam and linear absorption of the recording beam not smaller than 1.5% per recording layer and not more than 5% per recording layer, and the polymer binder undergoes a change in shape by the generated heat, whereby an interface between the recording layer and the intermediate layer undergoes a change in shape to record information.

2. The optical information recording medium according to claim 1, wherein a protrusion sticking out into the intermediate layer is to be formed in the interface.

3. The optical information recording medium according to claim 2, wherein the protrusion sticks out in the range of 1-300 nm from a position of the interface before undergoing a change in shape.

4. The optical information recording medium according to claim 2, wherein the intermediate layer forming the interface in which the protrusion is formed is softer than the recording layer.

5. The optical information recording medium according to claim 2, wherein a glass transition temperature of the intermediate layer forming the interface in which the protrusion is formed is lower than a glass transition temperature of the recording layer.

6. The optical information recording medium according to claim 2, wherein a thickness of each of the recording layers is in the range of 50 nm to 5 micrometers.

7. The optical information recording medium according to claim 1, wherein the recording beam has a wavelength of 405 nm.

8. The optical information recording medium according to claim 1, wherein the polymer binder consists of polyvinyl acetate, and wherein the recording material consists essentially of the dye and the binder.

* * * * *